United States Patent
Tamakoshi et al.

(10) Patent No.: US 10,458,353 B2
(45) Date of Patent: Oct. 29, 2019

(54) ENGINE CONTROL METHOD AND CONTROL DEVICE

(71) Applicant: NISSAN MOTOR CO., LTD., Kanagawa (JP)

(72) Inventors: Kenji Tamakoshi, Kanagawa (JP); Masaru Tomita, Kanagawa (JP); Makoto Tanibata, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/317,351

(22) PCT Filed: Jul. 13, 2016

(86) PCT No.: PCT/JP2016/070730
§ 371 (c)(1),
(2) Date: Jan. 11, 2019

(87) PCT Pub. No.: WO2018/011922
PCT Pub. Date: Jan. 18, 2018

(65) Prior Publication Data
US 2019/0234334 A1 Aug. 1, 2019

(51) Int. Cl.
F02D 41/14 (2006.01)
F02D 41/00 (2006.01)
F02D 41/04 (2006.01)

(52) U.S. Cl.
CPC ..... F02D 41/1497 (2013.01); F02D 41/0002 (2013.01); F02D 41/04 (2013.01);
(Continued)

(58) Field of Classification Search
CPC .. F02D 41/1497; F02D 41/04; F02D 41/0002; F02D 2200/602;
(Continued)

(56) References Cited

U.S. PATENT DOCUMENTS 5,660,157 A * 8/1997 Minowa ................ B60W 30/18
123/344
5,692,472 A 12/1997 Bedema et al.
(Continued)

FOREIGN PATENT DOCUMENTS

CN 104632432 A 5/2015
DE 19536038 A1 4/1997
(Continued)

Primary Examiner — Hung Q Nguyen
(74) Attorney, Agent, or Firm — Osha Liang LLP

(57) ABSTRACT

A method of controlling an engine includes setting a target torque of the engine, controlling an engine torque based on the target torque, setting an allowable torque that is greater than the target torque, detecting a plurality of differing operating state parameters as indicators indicating an actual operating state of the engine, individually calculating actual torques that are actual engine torques based on the plurality of detected operating state parameters, selecting a largest value among the calculated actual torques as a final actual torque, comparing the selected actual torque to the allowable torque, and generating a control signal according to a result of comparison between the actual torque and the allowable torque.

8 Claims, 7 Drawing Sheets

(52) U.S. Cl.
CPC ............... *F02D 2200/0404* (2013.01); *F02D 2200/0406* (2013.01); *F02D 2200/0616* (2013.01); *F02D 2200/101* (2013.01); *F02D 2200/1002* (2013.01); *F02D 2200/602* (2013.01)

(58) Field of Classification Search
CPC ..... F02D 2200/0616; F02D 2200/0404; F02D 2200/0406; F02D 2200/1002; F02D 2200/101
See application file for complete search history.

(56) References Cited

U.S. PATENT DOCUMENTS

| | | |
|---|---|---|
| 6,386,180 B1 | 5/2002 | Gerhardt et al. |
| 2007/0179016 A1 | 8/2007 | Honda et al. |
| 2008/0262697 A1 | 10/2008 | Gangi et al. |
| 2010/0036558 A1* | 2/2010 | Murakami .......... B60W 30/188 701/31.4 |

FOREIGN PATENT DOCUMENTS

| | | |
|---|---|---|
| DE | 102004040926 A1 | 3/2006 |
| DE | 102005010456 A1 | 9/2006 |
| EP | 1780390 A1 | 5/2007 |
| JP | S63-71551 A | 3/1988 |
| JP | 2002-535533 A | 10/2002 |
| JP | 2007-261366 A | 10/2007 |
| JP | 2008-510921 A | 4/2008 |
| JP | 2008-286165 A | 11/2008 |
| JP | 2010-163916 A | 7/2010 |
| JP | 2013-68146 A | 4/2013 |

* cited by examiner

ENGINE CONTROL METHOD AND CONTROL DEVICE

BACKGROUND

Technical Field

The present invention relates to engine control device and control method of controlling engine torque based on a target torque and monitoring a torque that is actually generated by an engine.

Related Art

There is a technology for monitoring engine torque while setting the target value of engine torque as a target torque and controlling the engine torque so as to realize the target torque. More specifically, this technology is to calculate a torque that is actually generated by an engine as an actual torque and compare the actual torque to an allowable torque.

Herein, as a technology for monitoring engine torque, JP2008-510921A discloses the following (paragraphs 0022-0025).

The technology sets a reference torque as the target value of engine torque from the operating amount of an accelerator pedal, and controls the operation of a fuel injection valve based on the reference torque. On the other hand, the technology calculates an actual torque that is actually generated by an engine from the operating parameters of the engine, and then records the occurrence of an error and stops the operation of the fuel injection valve from the viewpoint of safety when the actual torque exceeds an allowable torque set based on the reference torque. Herein, the technology detects the injection time and injection pressure (fuel pressure) of the fuel injection valve as the operating parameters of the engine, and considers the individual characteristics of the fuel injection valve in case of the calculation of the actual torque based on the injection time etc. As characteristics to consider in the actual torque calculation, JP2008-510921A publishes manufacturing variation or error (specifically, the diameter of a nozzle opening of the fuel injection valve) and aging characteristics of the fuel injection valve.

SUMMARY OF INVENTION

According to the technology disclosed in JP2008-510921A, when engine torque increases regardless of the intention of a driver due to some operational troubles of the fuel injection valve, the increase is detected by the comparison between an actual torque and an allowable torque and the operation of the fuel injection valve is stopped so as to be able to ensure safety. For example, when the injection pressure of fuel is higher than a target value according to a reference torque, an actual fuel injection amount exceeds a target amount, and the engine generates a torque greater than the reference torque, the troubles can be detected because the actual torque exceeds the allowable torque.

However, when the actual torque is calculated to be a value smaller than an original value because the detection of the injection pressure is not accurate or the calculation process of the actual torque based on the injection pressure has a trouble, there is the concern that such a trouble cannot be detected because the calculated actual torque still maintains a value less than the allowable torque even if the engine generates a torque more than the allowable torque.

One or more embodiments of the present invention more accurately calculates a torque that is actually generated by an engine and thus to contribute to a more appropriate control of the engine.

One or more embodiments of the present invention provides a method of controlling an engine.

In a method of controlling an engine according to one or more embodiments of the present invention, a target torque of the engine is set and an engine torque is controlled based on the set target torque. The method includes: setting an allowable torque greater than the target torque; detecting a plurality of different operating state parameters as indicators indicating an actual operating state of the engine; individually calculating actual torques that are actual engine torques based on the plurality of detected operating state parameters; and selecting a largest value among the calculated actual torques as a final actual torque. The method further includes: comparing the selected actual torque to the allowable torque; and generating a control signal according to a result of comparison between the actual torque and the allowable torque.

DETAILED DESCRIPTION

Hereinafter, exemplary embodiments of the present invention will be explained with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Entire Configuration of Engine)

Figure 1:
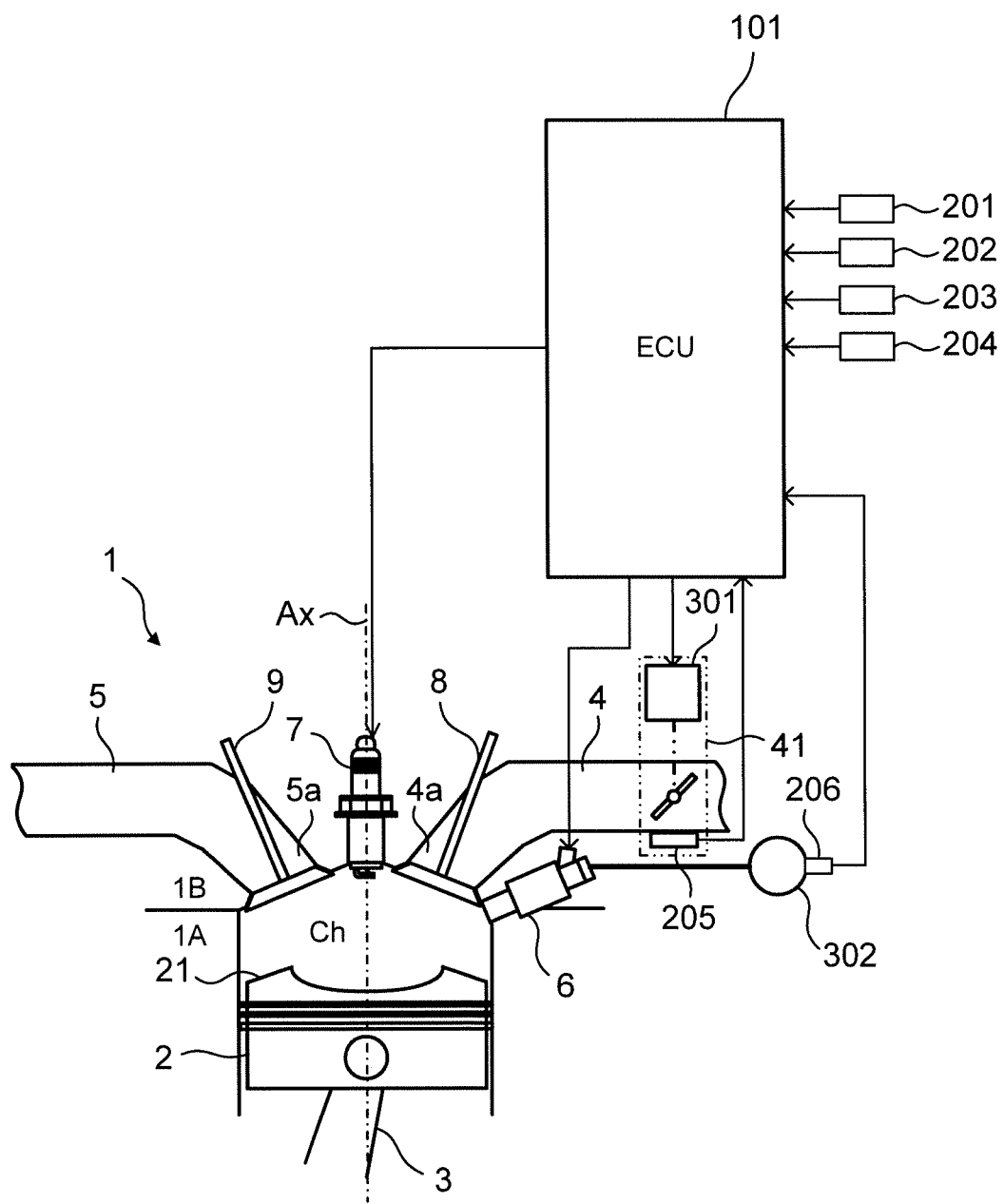
FIG. 1 is an entire configuration diagram illustrating an engine according to one or more embodiments of the present invention.

FIG. 1 is an entire configuration diagram illustrating an engine 1 according to one or more embodiments of the present invention (hereinafter, simply called "engine").

In one or more embodiments of the present invention, the engine 1 is a direct fuel injection engine and is configured to be able to directly inject fuel into a cylinder. The engine 1 is not limited to a direct fuel injection engine, and may be a port injection engine that injects fuel into a port part 4a of an intake passage 4. FIG. 1 illustrates only one cylinder for the sake of convenience. However, the number of cylinders is not limited to one, and it goes without saying that the number of cylinders may be two or more.

In regard to the engine 1, its main body is formed by a cylinder block 1A and a cylinder head 1B, and the cylinder is formed as a space surrounded by the cylinder block 1A and the cylinder head 1B.

A piston 2 is inserted into the cylinder block 1A to be able to reciprocate up and down along a cylinder center axis Ax, and the piston 2 is coupled to a crank shaft (not illustrated) via a connecting rod 3. The reciprocating motion of the piston 2 is transmitted to the crank shaft through the connecting rod 3 and is converted into the rotational motion of the crank shaft. A top surface 21 of the piston 2 has a cavity formed thereon. Accordingly, the smooth flow of air sucked into the cylinder through the port part (intake port) 4a of the intake passage 4 is restrained from being obstructed by the piston top surface 21, and the fuel injected by a fuel injection valve 6 is guided by a wall surface of the cavity to head for an ignition plug 7.

The cylinder head 1B has a lower surface defining a pentroof combustion chamber Ch. The combustion chamber Ch is formed as a space surrounded by the lower surface of the cylinder head 1B and the top surface 21 of the piston 2. As passages that communicate between the combustion chamber Ch and the outside of the engine 1, the cylinder head 1B has a pair of intake passages 4 on one side and a pair of exhaust passages 5 on the other side of the cylinder center axis Ax. An intake valve 8 is placed in the port part (intake port) 4a of the intake passage 4, and an exhaust valve 9 is placed in a port part (exhaust port) 5a of the exhaust passage 5. Air taken into the intake passage 4 from the outside of the engine 1 is sucked into the cylinder during opening the intake valve 8, and exhaust gas after combustion is discharged to the exhaust passage 5 during opening the exhaust valve 9.

The intake passage 4 is provided with an electronically-controlled throttle device 41. The flow rate of air sucked into the cylinder via the intake passage 4 is controlled by the electronically-controlled throttle device 41. The electronically-controlled throttle device 41 has a butterfly valve as a valve body, and its rotating shaft is coupled to an actuator (hereinafter, called "throttle actuator") 301. The revolving position (hereinafter, called "throttle opening") of the valve body is controlled by the throttle actuator 301.

Furthermore, in the cylinder head 1B, the ignition plug 7 is provided between the intake port 4a and the exhaust port 5a along the cylinder center axis Ax, and the fuel injection valve 6 is placed between a pair of intake ports 4a and 4a on one side of the cylinder center axis Ax. The fuel injection valve 6 is configured and placed to be supplied with fuel from a fuel accumulator (high pressure fuel piping) 302 that leads to a fuel tank (not illustrated) and to directly inject the fuel into the cylinder.

A catalytic converter (not illustrated) is interposed in the exhaust passage 5, and a catalyst for exhaust gas purification is accommodated in the catalytic converter. In one or more embodiments of the present invention, an exhaust gas purification device is a three-way catalyst. The exhaust gas after combustion discharged to the exhaust passage 5 is released into the atmospheric air after harmful components such as a nitrogen oxide (NOx), carbon monoxide (CO), and hydrocarbon (HC) are purified by the exhaust gas purifying catalyst.

(Configuration of Control System)

The operation of the engine 1 is controlled by an electronic control unit 101. The electronic control unit 101 constitutes an "engine control unit" according to one or more embodiments of the present invention, and includes a microcomputer that includes a central processing unit (CPU), various storage devices such as RAM and ROM, an input-output interface, and the like. The electronic control unit 101 receives the detection signals of "an acceleration sensor 201, a revolution speed sensor 202, and a cooling-water temperature sensor 203" and the detection signals of "an air flow meter 204, a throttle sensor 205, a fuel pressure sensor 206, an air-fuel ratio sensor (not illustrated), and the like".

The acceleration sensor 201 detects the operation amount (hereinafter, called "accelerator pedal operation amount") of an accelerator pedal performed by a driver. The accelerator pedal operation amount represents an indicator of a load required for the engine 1. The revolution speed sensor 202 detects a revolution speed of the engine 1. The revolution speed sensor 202 may employ a crank angle sensor. The crank angle sensor converts a signal (unit crank angle signal) output every unit crank angle or a signal (reference crank angle signal) output every reference crank angle into the number of revolutions (for example, the number of revolutions per one minute, hereinafter called "engine revolution speed") per unit time so as to detect a revolution speed. The cooling-water temperature sensor 203 detects the temperature of engine cooling water. Instead of the temperature of the engine cooling water, one or more embodiments of the present invention may employ the temperature of engine lubricating oil.

The air flow meter 204 is provided in an introduction part of the intake passage 4 to detect the flow rate of air (intake air amount) sucked into the engine 1. In one or more embodiments of the present invention, the air flow meter 204 is configured by a hot-wire flow meter. The throttle sensor 205 detects the revolving position (throttle opening) of the valve body of the electronically-controlled throttle device 41. In one or more embodiments of the present invention, the throttle sensor 205 is configured by a potentiometer and is assembled into the electronically-controlled throttle device 41. The combustion pressure sensor 206 is provided in the high pressure fuel piping 302 to detect the pressure of fuel to be supplied to the fuel injection valve 6. The air-fuel ratio sensor is provided in the exhaust passage 5 to detect the air-fuel ratio of exhaust gas.

The electronic control unit 101 includes a storage device (in one or more embodiments of the present invention, ROM) that stores map data to which various operation control amounts such as a target torque are allotted in accordance with engine operating states such as a load, a revolution speed, and cooling water temperature of the engine 1. During the actual operation of the engine 1, the electronic control unit sets a fuel injection amount, fuel injection timing, ignition timing, and the like with reference to the map data of the storage device based on the operating state of the engine 1.

(Basic Routine of Engine Control)

The content of control that is executed by the electronic control unit 101 will be explained with reference to a flowchart.

Figure 2:
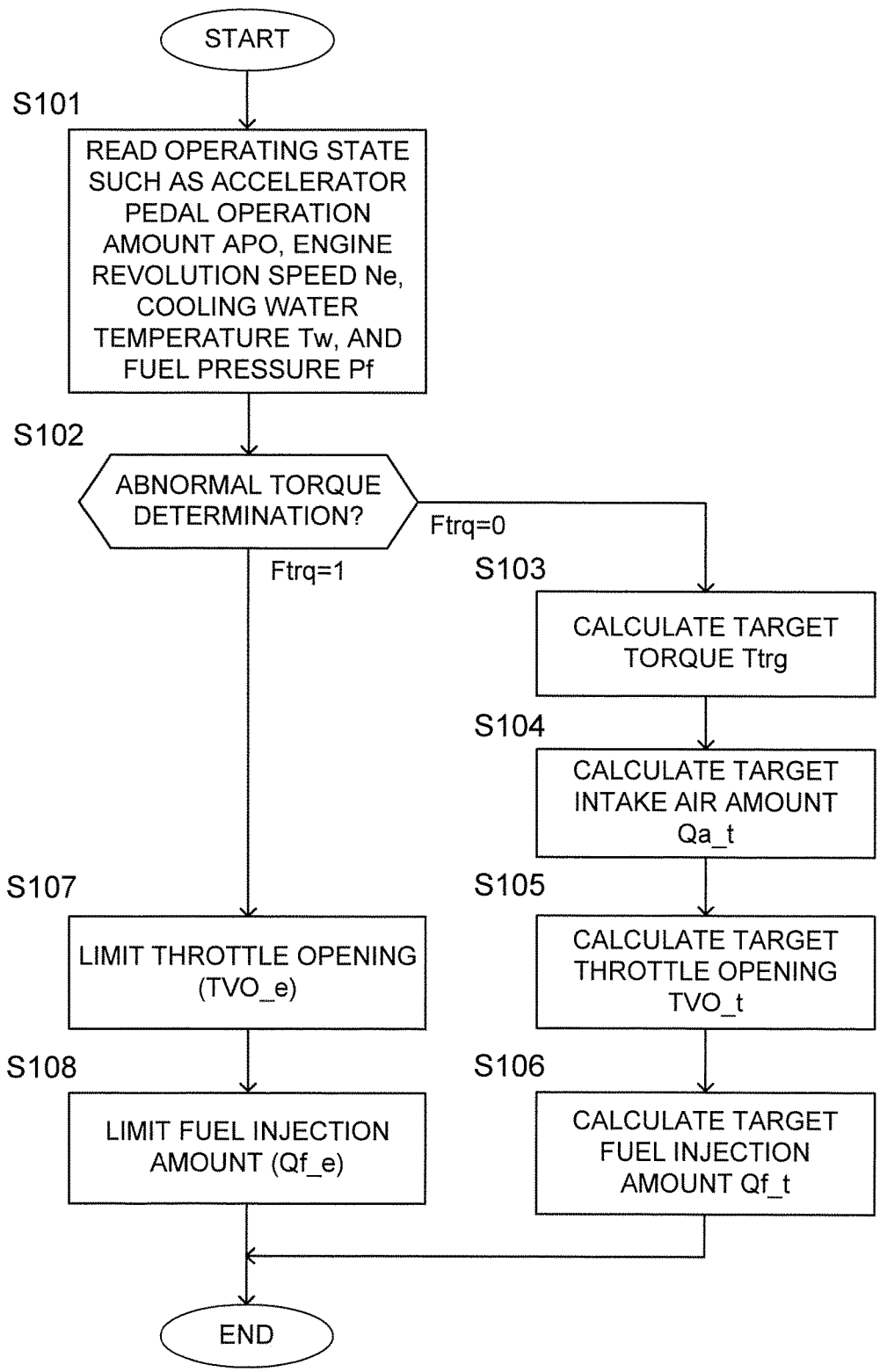
FIG. 2 is a flowchart schematically illustrating the flow of engine control according to one or more embodiments of the present invention.

FIG. 2 is a flowchart schematically illustrating the flow of a basic routine of engine control according to one or more embodiments of the present invention. The electronic control unit 101 executes a control routine illustrated in FIG. 2 at every predetermined time after the completion of a warm-up of the engine 1.

In Step S101, the electronic control unit reads an accelerator pedal operation amount APO, an engine revolution speed Ne, a cooling water temperature Tw, a fuel pressure Pf, and the like as parameters indicating the operating state of the engine 1.

In Step S102, the electronic control unit reads an abnormality determination flag Ftrq to be described later as the determination result of abnormal torque. The electronic control unit moves the control to S103 when the value of the flag is zero, and moves the control to S107 when the value of the flag is one. The abnormality determination flag Ftrq is set to zero at the time of the shipment or the delivery of a vehicle equipped with the engine 1 from a manufacturing factory or from a repair shop. By performing an abnormal torque determination process illustrated in FIG. 3, the abnormality determination flag Ftrq is maintained to zero or is modified to one in accordance with the result of comparison between an actual torque Tact and an allowable torque Tlim. The abnormality determination flag Ftrq is maintained to one even after the engine 1 is stopped when the value is modified from zero to one, and is rewritten to zero at the time of the completion of required repair at the repair shop.

In Step S103, the electronic control unit calculates a target torque Ttrg of the engine 1 based on the accelerator pedal operation amount APO and the engine revolution speed Ne. The calculation of the target torque Ttrg is executed by referring to map data to which the target torque Ttrg is allotted in accordance with the accelerator pedal operation amount APO and the engine revolution speed Ne.

In Step S104, the electronic control unit calculates a target value (target intake air amount) Qa_t of an intake air amount according to the target torque Ttrg. The target intake air amount Qa_t is set to a larger value as the target torque Ttrg grows larger.

In Step S105, the electronic control unit calculates a target value (target throttle opening) TVO_t of the throttle opening based on the target intake air amount Qa_t and the engine revolution speed Ne. The calculation of the target throttle opening TVO_t is executed by referring to map data to which the target throttle opening TVO_t according to the target intake air amount Qa_t is allotted every the engine revolution speed Ne. The electronic control unit 101 sets a driving signal according to the target throttle opening TVO_t and outputs the driving signal to the electronically-controlled throttle device 41.

In Step S106, the electronic control unit calculates a target value (target fuel injection amount) Qf_t of a fuel injection amount according to the target intake air amount Qa_t. The target fuel injection amount Qf_t is set to a larger value as the target intake air amount Qa_t grows larger. An amendment according to the cooling water temperature Tw etc. is performed on the target fuel injection amount Qf_t calculated in this way, and the final target fuel injection amount Qf_t is calculated. The electronic control unit 101 sets a driving signal according to the target fuel injection amount Qf_t and the fuel pressure Pf and outputs the driving signal to the fuel injection valve 6. In one or more embodiments of the present invention, the electronic control unit sets the target fuel injection amount Qf_t to an equivalent with respect to the target intake air amount Qa_t, but can consider a target air-fuel ratio upon calculating the target fuel injection amount Qf_t when changing the target air-fuel ratio in accordance with an operating area of the engine 1.

In Steps S107 and S108, the electronic control unit prohibits engine control based on the accelerator pedal operation amount APO or the target torque Ttrg and limits the actuation of the engine 1. In other words, the electronic control unit limits a torque to be generated by the engine 1 to a value smaller than the target torque Ttrg according to the accelerator pedal operation amount APO.

In Step S107, the electronic control unit sets a throttle opening TVO of the electronically-controlled throttle device 41 to a limited throttle opening TVO_e smaller than the target throttle opening TVO_t according to the accelerator pedal operation amount APO. In one or more embodiments of the present invention, the limited throttle opening TVO_e is a fixed value or a calculated value only sufficient to allow low-speed running or evacuation running toward the repair shop of the vehicle. As an example, the fixed value may be a value by which only the evacuation running having 30 km per an hour as an upper limit can be performed. To enable smooth stop and start during the evacuation running, the electronic control unit may set the limited throttle opening TVO_e as the calculated value and change the opening as far as the vehicle speed does not exceed 30 km per an hour. The electronic control unit 101 outputs a limit command signal to the electronically-controlled throttle device 41. Then, the electronically-controlled throttle device 41 receives the limit command signal from the electronic control unit 101 and drives the valve body to a revolving position corresponding to the limited throttle opening TVO_e by using the throttle actuator 301. Herein, the "limit command signal" corresponds to a "control signal" that is generated to limit the actuation of the engine 1.

In Step S108, the electronic control unit sets a fuel injection amount Qf to a limited fuel injection amount Qf_e smaller than the target fuel injection amount Qf_t according to the accelerator pedal operation amount APO, and prohibits the vehicle from running at a vehicle speed more than 30 km per an hour.

In one or more embodiments of the present invention, when the abnormality determination flag Ftrq is modified to one by the abnormal torque determination process, namely, when it is determined that the abnormality determination flag Ftrq is one in the determination step illustrated in S102, the electronic control unit limits the actuation of the engine 1 by the process illustrated in Steps S107 and S108 and stops the abnormal torque determination process (including the calculation of the actual torque Tact) to maintain the abnormality determination flag Ftrq to one.

(Abnormal Torque Determination Routine)

Figure 3:
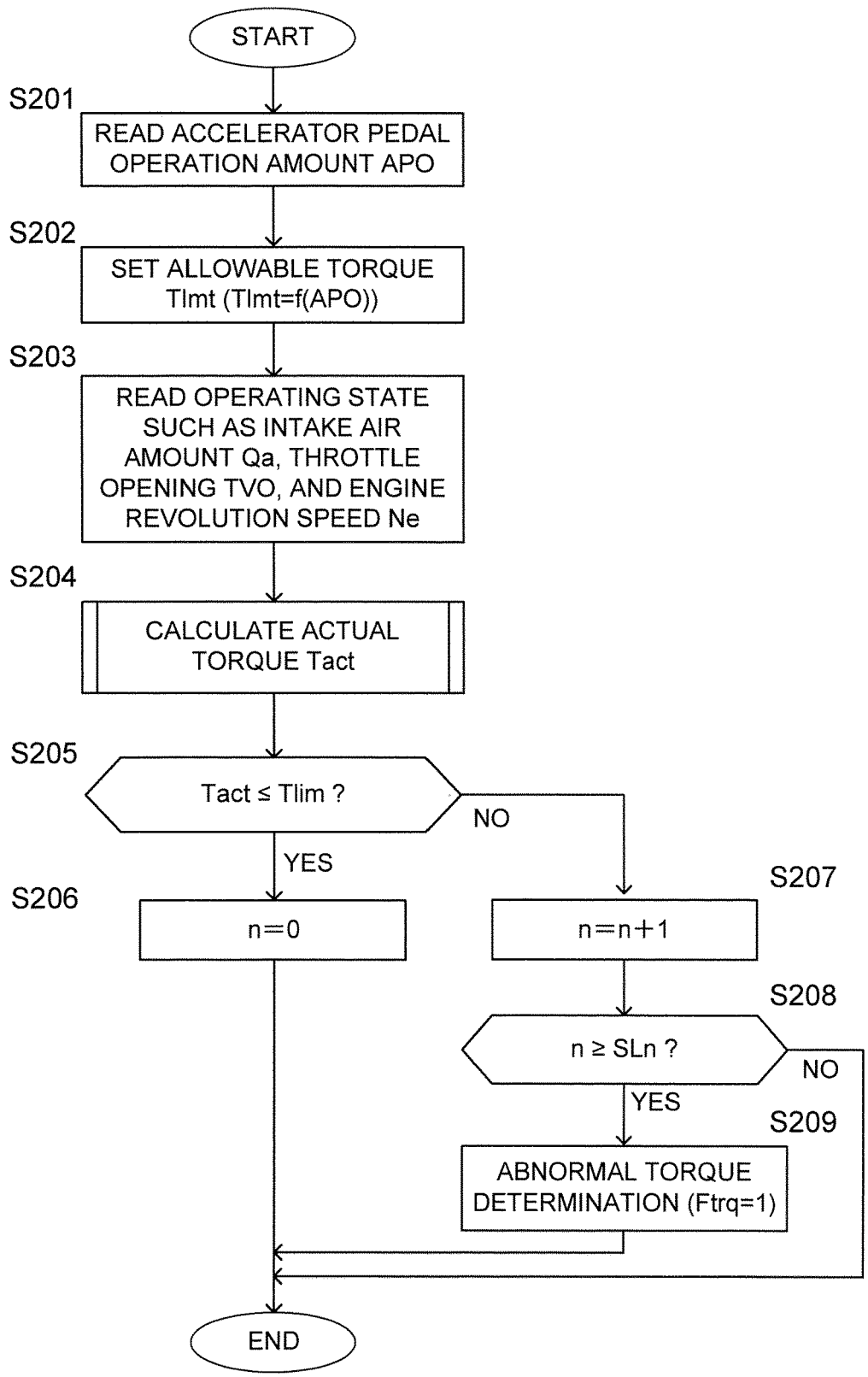
FIG. 3 is a flowchart illustrating the content of an abnormal torque determination process in the engine control.

FIG. 3 is a flowchart illustrating the flow of an abnormal torque determination routine of engine control according to one or more embodiments of the present invention. The electronic control unit 101 executes a control routine illustrated in FIG. 3 at every predetermined time after the completion of a warm-up of the engine 1.

In Step S201, the electronic control unit reads the accelerator pedal operation amount APO and the engine revolution speed Ne.

In Step S202, the electronic control unit calculates an allowable torque Tlmt to monitor engine torque based on the read accelerator pedal operation amount APO etc. The allowable torque Tlmt is set to a value greater than the target torque Ttrg. In one or more embodiments of the present invention, the allowable torque Tlmt is calculated by referring to map data to which the allowable torque Tlmt is allotted in accordance with the accelerator pedal operation amount APO and the engine revolution speed Ne. The map data to calculate the allowable torque Tlmt is set separately from the map data to calculate the target torque Ttrg, and is stored in the storage device (for example, ROM) of the electronic control unit 101. In the map data, the allowable torque Tlmt is set to indicate an increasing or decreasing trend similar to that of the target torque Ttrg with respect to the accelerator pedal operation amount APO etc. In one or more embodiments of the present invention, the allowable torque Tlmt is set to have a larger value than the target torque Ttrg by a predetermined torque ΔT.

In Step S203, the electronic control unit reads an intake air amount Qa, the throttle opening TVO, and the engine revolution speed Ne as parameters indicating the engine operating state of the engine 1. Herein, the intake air amount Qa and the throttle opening TVO respectively correspond to a "first operating state parameter" and a "second operating state parameter" that indicate the actual operating state of the engine 1.

In Step S204, the electronic control unit calculates a torque actually generated by the engine 1 as the actual torque Tact. The calculation of the actual torque Tact will be explained later with reference to a flowchart illustrated in FIG. 4.

In Step S205, the electronic control unit determines whether the actual torque Tact is not more than the allowable torque Tlmt. The electronic control unit moves the control to S206 when the actual torque Tact is not more than the allowable torque Tlmt, and moves the control to S207 when exceeding the allowable torque Tlmt.

In Step S206, the electronic control unit determines that the engine torque is suppressed to a value not more than the allowable torque Tlmt and thus the engine control is normally performed, and maintains the abnormality determination flag Ftrq to zero and sets a value "n" of a counter to zero (n=0).

In Step S207, the electronic control unit adds one to the value "n" of the counter (n=n+1).

In S208, the electronic control unit determines whether the value "n" of the counter after the addition reaches a predetermined value SLn. The electronic control unit moves the control to S209 when the value "n" of the counter reaches the predetermined value SLn, and terminates this control routine when not reaching the predetermined value.

In Step S209, the electronic control unit determines that the engine 1 generates an excessively large torque and thus the engine control has some troubles, and modifies the abnormality determination flag Ftrq to one. As described above, in one or more embodiments of the present invention, when the actual torque Tact exceeds the allowable torque Tlmt (S205) and the determination that the engine torque is excessive is continuously repeated by the number of times defined by the predetermined value SLn, the electronic control unit determines that the engine control has a trouble. As a result, it is possible to prevent the occurrence of a trouble during transient operation from being determined and the actuation of the engine 1 from being limited.

Figure 4:
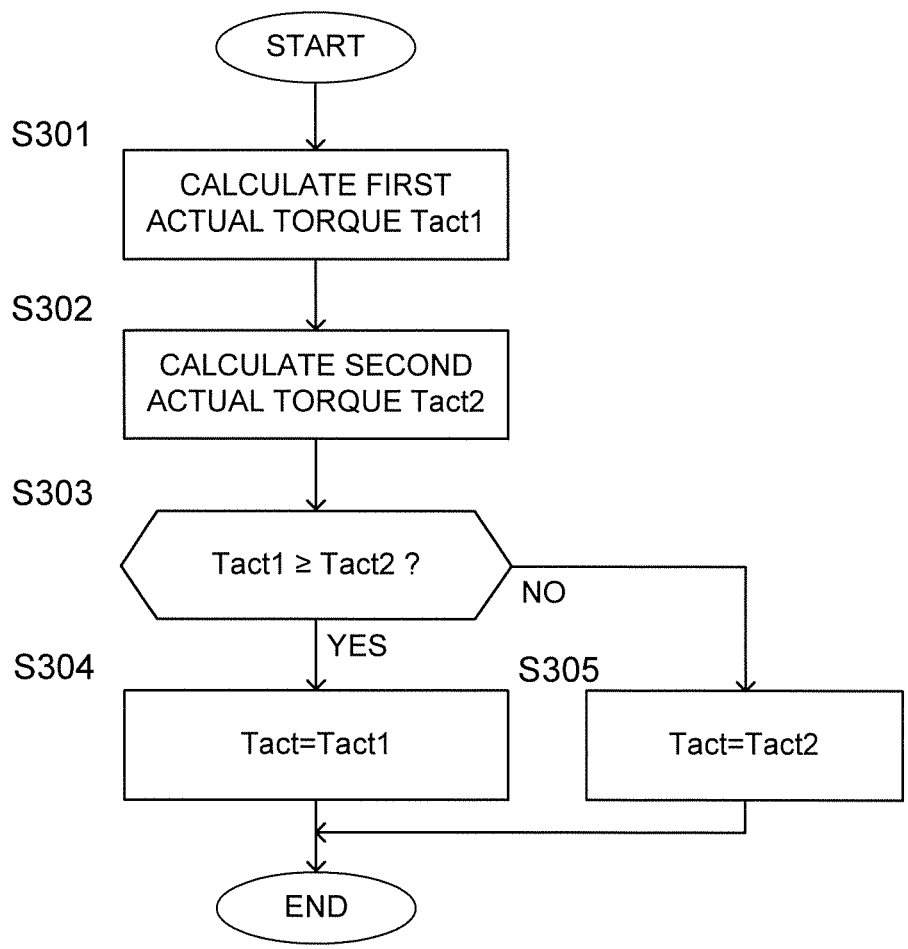
FIG. 4 is a flowchart illustrating the content of an actual torque calculation process in the engine control.

FIG. 4 is a flowchart illustrating the content of an actual torque calculation process executed in Step S204 of the control routine illustrated in FIG. 3.

Figure 5A:
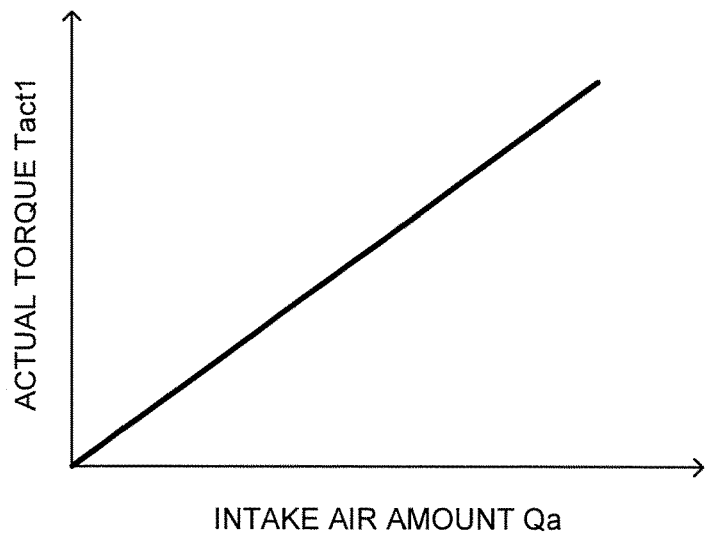
FIG. 5A is a diagram explaining the tendency of map data used for the calculation of a first actual torque.

In Step S301, the electronic control unit calculates a first actual torque Tact1 based on the intake air amount Qa. In one or more embodiments of the present invention, the calculation of the first actual torque Tact1 is executed by referring to map data, having a tendency illustrated in FIG. 5A, to which the first actual torque Tact1 is allotted in accordance with the intake air amount Qa. The first actual torque Tact1 is calculated as a larger value as the intake air amount Qa grows larger.

Figure 5B:
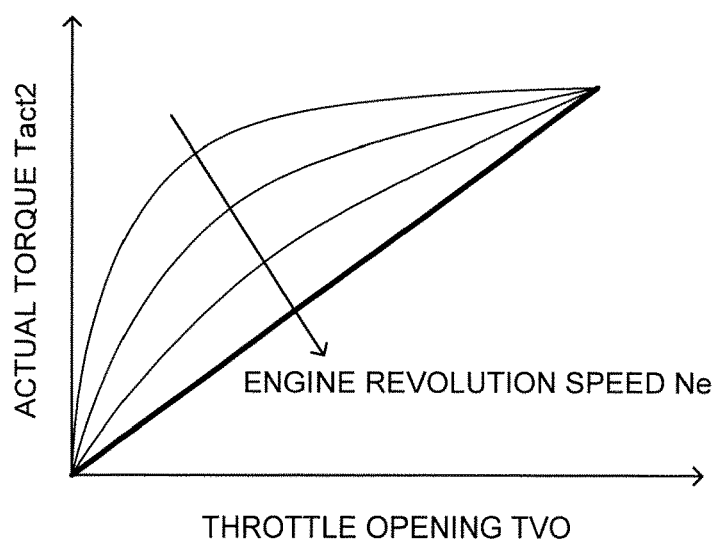
FIG. 5B is a diagram explaining the tendency of map data used for the calculation of a second actual torque.

In Step S302, the electronic control unit calculates a second actual torque Tact2 based on the throttle opening TVO and the engine revolution speed Ne. The calculation of the second actual torque Tact2 is executed by referring to map data, having a tendency illustrated in FIG. 5B, to which the second actual torque Tact2 according to the throttle opening TVO is allotted every the engine revolution speed Ne. The second actual torque Tact2 is calculated as a larger value as the throttle opening TVO grows larger, but the tendency of the change in the second actual torque Tact2 with respect to the throttle opening TVO differs in accordance with the engine revolution speed Ne.

In one or more embodiments of the present invention, the electronic control unit multiplies a predetermined value a smaller than one by the second actual torque Tact2 calculated based on the throttle opening TVO and the engine revolution speed Ne, and sets this multiplication value (=Tact2×α) as the final second actual torque Tact2. Because it is considered that the first actual torque Tact1 has a property closer to a measured value based on the intake air amount Qa, this is generally to ensure that the first actual torque Tact1 is selected as the final actual torque Tact in the comparison described below. In this regard, however, when the precision of the second actual torque Tact2 can be adequately ensured by reflecting atmospheric pressure in the calculation of the second actual torque Tact2, for example, the predetermined value a can be increased in accordance with the precision and thus the predetermined value a may be set to 1.

In Step S303, the electronic control unit determines whether the first actual torque Tact1 is not less than the second actual torque Tact2. The electronic control unit moves the control to S304 when the first actual torque Tact1 is not less than the second actual torque Tact2, and moves the control to S305 when being less than the second actual torque Tact2.

In Step S304, the electronic control unit selects the first actual torque Tact1 as the final actual torque Tact (Tact=Tact1).

In Step S305, the electronic control unit selects the second actual torque Tact2 as the final actual torque Tact (Tact=Tact2).

In one or more embodiments of the present invention, the electronic control unit 101 constitutes an "engine control unit". In this case, the air flow meter 204 constitutes a "first operating state sensor" and the throttle sensor 205 constitutes a "second operating state sensor".

The electronic control unit 101 realizes a function as a "target torque setting unit" by the process of Step S103 of the flowchart illustrated in FIG. 2, realizes a function as an "engine torque control unit" by the process of Steps S104 to S106 of the flowchart illustrated in FIG. 2, realizes a function as an "allowable torque setting unit" by the process of Step S202 of the flowchart illustrated in FIG. 3, realizes a function as an "actual torque calculating unit" by the process of Steps S301 and S302 of the flowchart illustrated in FIG. 4, realizes a function as an "actual torque selecting unit" by the process of Steps S303 to S305 of the flowchart illustrated in FIG. 4, realizes a function as a "torque comparing unit" by the process of Step S205 of the flowchart illustrated in FIG. 3, and realizes a function as a "control signal output unit" by the process of Step S107 of the flowchart illustrated in FIG. 2.

(Explanation by Time Chart)

Figure 6:
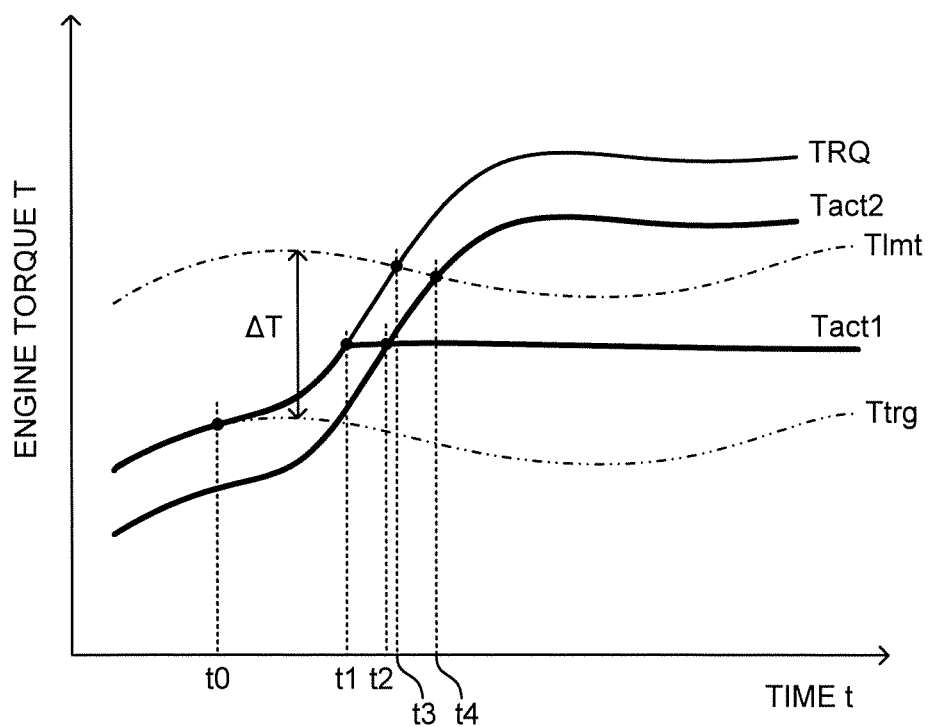
FIG. 6 is a diagram explaining the operation of an electronic control unit relating to the determination of abnormal torque.

FIG. 6 is a diagram explaining the operation of the electronic control unit 101 relating to the determination of abnormal torque.

The electronic control unit 101 calculates the target torque Ttrg of the engine 1 based on the accelerator pedal operation amount APO and the engine revolution speed Ne, and controls the operations of the electronically-controlled throttle device 41 and the fuel injection valve 6 so as to realize the target torque Ttrg. Therefore, if these engine control parts normally operate and thus the engine control is normally performed, an engine torque TRQ is changed to follow the target torque Ttrg (illustrated with a two-dot chain line).

Herein, for the monitoring of engine torque, the electronic control unit sets the allowable torque Tlmt (illustrated with a chain line) greater than the target torque Ttrg and calculates a torque actually generated by the engine 1 as the actual torque Tact. When the actual torque Tact exceeding the allowable torque Tlmt is calculated, the electronic control unit determines that the engine control has some troubles and limits the actuation of the engine 1. For example, when the operation of the electronically-controlled throttle device 41 has a trouble and thus the electronically-controlled throttle device 41 is opened larger than the target throttle opening TVO_t, the electronic control unit can detect a trouble occurring in the electronically-controlled throttle device 41 and limit the actuation of the engine 1 because the actual torque Tact exceeds the allowable torque Tlmt.

However, when a trouble also occurs in the calculation process of the actual torque Tact in addition to the malfunction of the electronically-controlled throttle device 41, the electronic control unit cannot detect a trouble occurring in the electronically-controlled throttle device 41 by calculating the actual torque Tact having a value smaller than an original value and maintaining the actual torque to a value less than the allowable torque Tlmt, even though engine torque exceeding the allowable torque Tlmt is generated due to the malfunction of the electronically-controlled throttle device 41.

For example, it is assumed that although the detection of the intake air amount Qa is normally performed, the calculation process of the actual torque Tact based on the intake air amount Qa has a trouble and thus the actual torque Tact is calculated to be a value smaller than an original value. In this case, even if the electronically-controlled throttle device 41 is opened larger than the target throttle opening TVO_t and engine torque exceeding the allowable torque Tlmt is generated, a trouble occurring in the electronically-controlled throttle device 41 cannot be detected because the actual torque Tact is calculated to be a value smaller than an original value and the actual torque is maintained to a value less than the allowable torque Tlmt.

Furthermore, it is assumed that the calculation process of the target torque Ttrg as well as the calculation process of the actual torque Tact have troubles and thus the target torque Ttrg is calculated to be a value greater than an original value with some cause (for example, miscalculation). In this case, even if engine torque exceeding the allowable torque Tlmt is generated as a result of control based on the target torque Ttrg, a trouble (miscalculation of the target torque Ttrg) in the calculation process of the target torque Ttrg cannot be detected because the actual torque Tact is calculated to be a value smaller than an original value and is maintained to a value less than the allowable torque Tlmt.

On the contrary, in one or more embodiments of the present invention, the electronic control unit detects the intake air amount Qa and the throttle opening TVO as the operating state parameters of the engine 1, and calculates the first actual torque Tact1 based on the intake air amount Qa and calculates the second actual torque Tact2 based on the throttle opening TVO (and the engine revolution speed Ne). Then, the electronic control unit selects a larger one of the first and second actual torques Tact1 and Tact2 as the final actual torque Tact. Then, when the final actual torque Tact exceeds the allowable torque Tlmt, the electronic control unit determines that the engine control has a trouble and modifies the abnormality determination flag Ftrq to one to limit the actuation of the engine 1.

FIG. 6 illustrates the operation of the electronic control unit 101 relating to the abnormal torque determination process when the actual engine torque TRQ increases with deviation from the target torque Ttrg at a time t0 and exceeds the allowable torque Tlmt at a time t3. The cause of the deviation of the engine torque TRQ includes the miscalculation of the target torque Ttrg and the malfunction of the electronically-controlled throttle device 41. In other words, the miscalculation of the target torque Ttrg and the malfunction of the electronically-controlled throttle device 41 are the troubles of engine control that are supposed in one or more embodiments of the present invention.

If the calculation process of the first actual torque Tact1 does not have a trouble and the first actual torque Tact1 is normally calculated, the first actual torque Tact1 is changed in chase of the engine torque TRQ and thus exceeds the allowable torque Tlmt at the time t3 similarly to the engine torque TRQ. As a result, the trouble of engine control can be detected. Because the intake air amount Qa as a basis for calculating the first actual torque Tact1 more accurately indicates the actual engine torque TRQ, the electronic control unit can accurately grasp the engine torque TRQ by using the first actual torque Tact1 to precisely detect the trouble. On the contrary, when the calculation process of the first actual torque Tact1 has a trouble at a time t1 and the first actual torque Tact1 is calculated to be a value smaller than the original value (the engine torque TRQ) and is maintained to a value less than the allowable torque Tlmt even after the time t3, the electronic control unit cannot detect a trouble.

In one or more embodiments of the present invention, the second actual torque Tact2 exceeds the first actual torque Tact1 at a time t2 after the calculation process of the first actual torque Tact1 has the trouble, and thus the first actual torque Tact1 is selected as the actual torque Tact before the time t2 and the second actual torque Tact2 is selected as the actual torque Tact after the time t2.

As described above, because a larger one of the first and second actual torques Tact1 and Tact2 is selected as the final actual torque Tact, the second actual torque Tact2 is selected as the actual torque Tact after the time t2 at which the second actual torque Tact2 exceeds the first actual torque Tact1.

The second actual torque Tact2 is calculated from the throttle opening TVO that is an operating state parameter different from the intake air amount Qa. In the example illustrated in FIG. 6, the second actual torque Tact2 will exceed the allowable torque Tlmt at a time t4 after the second actual torque Tact2 is selected as the final actual torque Tact. Therefore, in one or more embodiments of the present invention, even if the calculation process of the first actual torque Tact1 has a trouble and thus the engine torque cannot be precisely monitored by using the first actual torque Tact1, the electronic control unit can detect the increase in the engine torque exceeding the allowable torque Tlmt by using the second actual torque Tact2 to detect the trouble of engine control.

The above is the contents of the engine control. Hereinafter, one or more effects obtained by one or more embodiments of the present invention are summarized.

In one or more embodiments of the present invention, while setting the target torque Ttrg of the engine 1 and controlling the engine torque based on the target torque Ttrg, the electronic control unit detects the plurality of differing operating state parameters (the intake air amount Qa and the throttle opening TVO) as indicators for indicating the actual operating state of the engine 1 and selects the largest value among the actual torques Tact1 and Tact2 individually calculated from the plurality of operating state parameters as the final actual torque Tact. Then, for the monitoring of engine torque, the electronic control unit sets the allowable torque Tlmt greater than the target torque Ttrg, compares the actual torque Tact to the allowable torque Tlmt, and limits the actuation of the engine 1 when the actual torque Tact exceeds the allowable torque Tlmt.

As described above, because the largest value among the actual torques individually calculated from the plurality of differing operating state parameters is selected as the final actual torque Tact, even if any one of the first and second actual torques Tact1 and Tact2 is calculated to be a value smaller than an original value due to the trouble occurring in the calculation process of the actual torque, the electronic control unit can grasp accurate engine torque and appropriately limit the actuation of the engine 1 by selecting the other of the actual torques as the final actual torque.

Furthermore, in one or more embodiments of the present invention, the target torque Ttrg and the allowable torque Tlmt are set by separate calculations based on the accelerator pedal operation amount APO. Therefore, when the engine torque increases due to a trouble occurring in the calculation process of the target torque Ttrg, the electronic control unit can detect this trouble.

For example, when the target throttle opening TVO_t is set to a value greater than an original value and the electronically-controlled throttle device 41 is opened larger than the original due to a trouble occurring in the calculation process of the target torque Ttrg, it is possible to prevent a trouble, which the actual torque Tact is still maintained to a value less than the allowable torque Tlmt even though the engine torque exceeding the allowable torque Tlmt is generated because the actual torque Tact is calculated to be a value smaller than an original value, from being overlooked.

Furthermore, the engine 1 can avoid continuing to generate an excessive torque by limiting the actuation of the engine 1 in response to the detection of the trouble.

Explanation on Other Embodiments

In one or more of the embodiment described above, the allowable torque Tlmt used for monitoring the engine torque is set by the individual calculation from the target torque Ttrg on the basis of the accelerator pedal operation amount APO. However, the invention is not limited to this. The allowable torque Tlmt may be calculated based on the target torque Ttrg.

Figure 7:
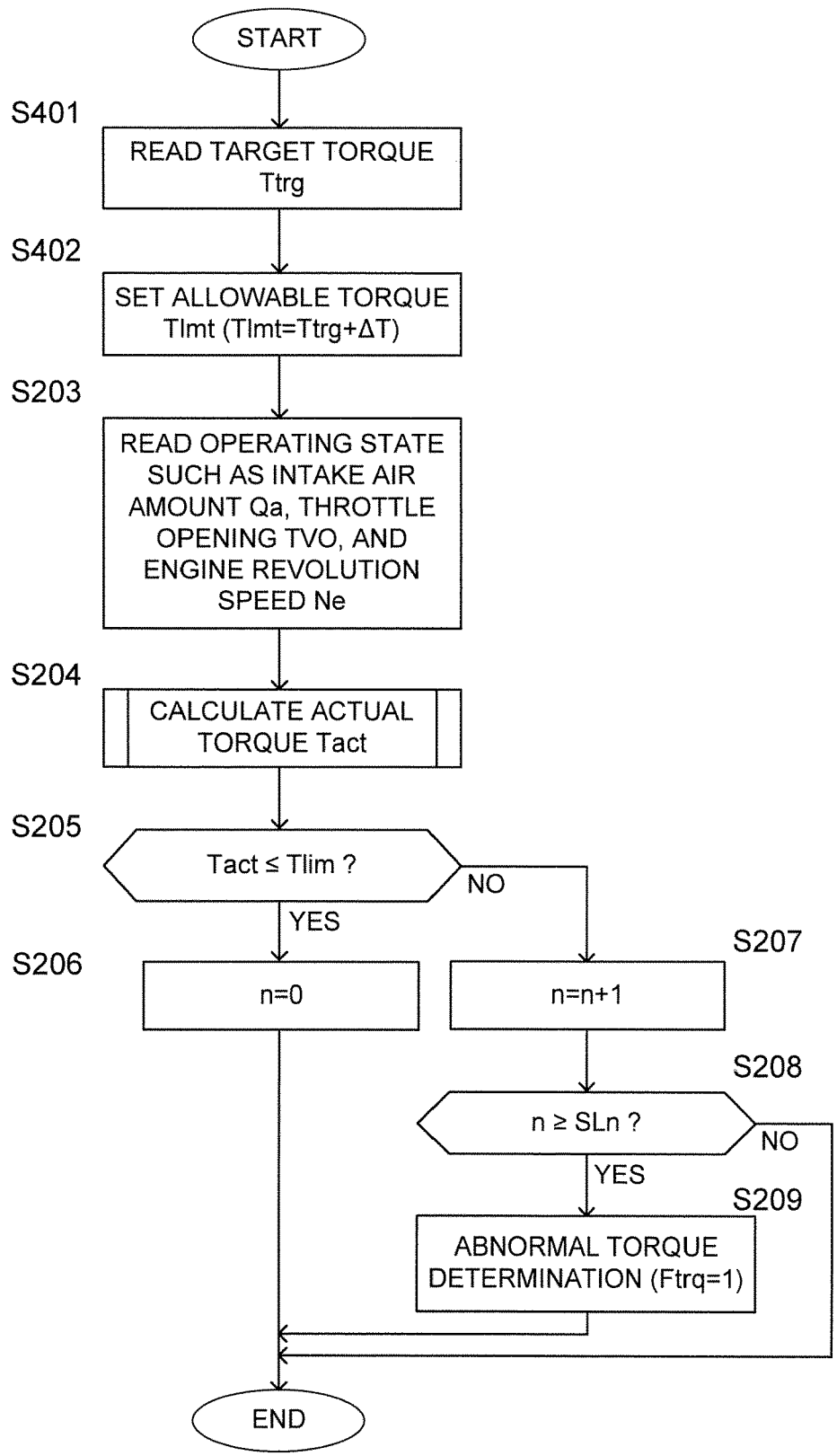
FIG. 7 is a flowchart schematically illustrating the flow of engine control according to one or more embodiments of the present invention.

As a control in this case, FIG. 7 illustrates the flow of a basic routine of engine control according to one or more embodiments of the present invention. The electronic control unit 101 executes a control routine illustrated in FIG. 7 at every predetermined time after the completion of a warm-up of the engine 1.

Herein, only the difference from the control routine illustrated in FIG. 3 will be explained. In Step S401, the electronic control unit reads the target torque Ttrg.

In Step S402, the electronic control unit calculates the allowable torque Tlmt based on the target torque Ttrg. In one or more embodiments of the present invention, the allowable torque Tlmt is set to a value obtained by adding the predetermined torque $\Delta T$ to the target torque Ttrg (Tlmt=Ttrg+$\Delta T$).

The allowable torque Tlmt is not limited to adding the predetermined torque $\Delta T$ to the target torque Ttrg, and can be also calculated by multiplying a predetermined value $\beta$ greater than one by the target torque Ttrg (Tlmt=Ttrg×$\beta$).

As described above, the setting of the allowable torque Tlmt can be more simply performed by setting the allowable torque Tlmt to a value obtained by adding the predetermined torque $\Delta T$ or multiplying the predetermined value $\beta$ to or by the target torque Ttrg.

The process executed in Steps S203 to S209 is the same as that executed in Steps S203 to S209 of the flowchart illustrated in FIG. 3.

In the above explanation, it has been explained that the actuation of the engine 1 is limited when the actual torque Tact exceeds the allowable torque Tlmt. However, in addition to or instead of such a limit, the electronic control unit may record the occurrence of a trouble in engine control or report this trouble to a driver. For example, by saving a special area in the storage device of the electronic control unit 101, when the abnormality determination flag Ftrq is modified to one as the result of the abnormal torque determination process, the electronic control unit records the result of determination in the special storage area. Furthermore, the notification to the driver can be perform by an alarm, a warning light, etc. A signal output from the electronic control unit 101 to the alarm, the warning light, etc. corresponds to a "control signal" that is generated to report the occurrence of an abnormal state to the driver. The appropriate maintenance and management of the engine 1 can be promoted by urging the driver to recognize the trouble.

The operating state parameters used for the calculation of the actual torque Tact are not limited to the intake air amount Qa and the throttle opening TVO, and thus may be any parameter having correlation characteristics. For example, an intake pressure can be employed as the first operating state parameter and a throttle opening can be employed as the second operating state parameter by employing an intake pressure sensor as the first operating state sensor and employing a throttle sensor as the second operating state sensor.

Furthermore, in the above explanation, the miscalculation of actual torque has been illustrated as a cause that the actual torque Tact (the first actual torque Tact1) is calculated to be a value smaller than an original value, in other words, as a trouble in the calculation process of the actual torque. However, the invention is not limited to this. For example, the similar control can be applied even when the intake air amount Qa is erroneously detected due to the malfunction of the air flow meter 204. More specifically, when the first actual torque Tact1 is calculated to be a value smaller than an original value due to the false detection of the intake air amount Qa, the second actual torque Tact2 exceeds the first actual torque Tact1. Therefore, the electronic control unit monitors engine torque by using the second actual torque Tact2 and limits its actuation when it is determined that the engine 1 generates an excessively large torque.

As described above, embodiments of the present invention have been explained, but the embodiments are only a part of the application example of the present invention and is not intended to limit the technical scope of the present invention to the specific configuration of the above embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of controlling an engine, comprising:
   setting a target torque of the engine;
   controlling an engine torque based on the target torque;
   setting an allowable torque that is greater than the target torque;
   detecting a plurality of differing operating state parameters as indicators indicating an actual operating state of the engine;
   individually calculating actual torques that are actual engine torques based on the plurality of detected operating state parameters;
   selecting a largest value among the calculated actual torques as a final actual torque;
   comparing the selected final actual torque to the allowable torque; and
   generating a control signal according to a result of comparison between the selected final actual torque and the allowable torque.

2. The method according to claim 1 further comprising:
   detecting an accelerator pedal operation amount performed by a driver,
   wherein the target torque and the allowable torque are set by individual calculations based on the detected accelerator pedal operation amount.

3. The method according to claim 1, further comprising
   detecting an accelerator pedal operation amount performed by a driver,
   wherein the target torque is set based on the detected accelerator pedal operation amount, and
   the allowable torque is set to a value obtained by adding a predetermined torque to or multiplying a predetermined value by the target torque.

4. The method according to claim 1, wherein the plurality of operating state parameters has mutually correlating characteristics.

5. The method according to claim 4,
   wherein the plurality of operating state parameters includes a first operating state parameter and a second operating state parameter,
   wherein the first operating state parameter is an intake air amount detected by an air flow meter, and
   wherein the second operating state parameter is a throttle opening detected by a throttle sensor.

6. The method according to claim 1, further comprising:
   generating, as the control signal, a signal for limiting an actuation of the engine when the selected final actual torque exceeds the allowable torque.

7. The method according to claim 1, further comprising:
   generating, as the control signal, a signal for recording occurrence of an abnormal state or reporting an occurrence of the abnormal state to a driver when the selected final actual torque exceeds the allowable torque.

8. An engine control device comprising:
   a first operating state sensor that detects a first operating state parameter as an indicator indicating an actual operating state of an engine;
   a second operating state sensor that detects a second operating state parameter different from the first operating state parameter as an indicator indicating the actual operating state of the engine; and
   an engine control unit (ECU) that receives detection signals of the first and second operating state sensors and controls an operation of the engine,
   wherein the ECU is configured to set a target torque of the engine,
   wherein the ECU is configured to control engine torque based on the set target torque;
   wherein the ECU is an allowable torque setting unit configured to set an allowable torque greater than the target torque;
   wherein the ECU is configured to individually calculate actual torques that are actual engine torques based on the detected first and second operating state parameters;
   wherein the ECU is configured to select a largest value among the calculated actual torques as a final actual torque;
   wherein the ECU is configured to perform a comparison between the selected final actual torque and the allowable torque; and
   wherein the ECU is configured to output a control signal according to a result of the comparison.

* * * * *